(12) United States Patent
Pauli

(10) Patent No.: US 9,253,442 B1
(45) Date of Patent: Feb. 2, 2016

(54) HOLOPRESENCE SYSTEM

(71) Applicant: Manfred Johann Pauli, Bad Schoenborn (DE)

(72) Inventor: Manfred Johann Pauli, Bad Schoenborn (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/508,627

(22) Filed: Oct. 7, 2014

(51) Int. Cl.
*H04N 13/04* (2006.01)
*H04N 7/15* (2006.01)
*H04N 13/02* (2006.01)
*H04N 7/14* (2006.01)

(52) U.S. Cl.
CPC .............. *H04N 7/15* (2013.01); *H04N 7/141* (2013.01); *H04N 13/0282* (2013.01); *H04N 13/0296* (2013.01)

(58) Field of Classification Search
CPC .......... H04N 13/0018; H04N 13/0025; H04N 13/0239; H04N 13/0246
USPC ................... 348/14.07, 51; 382/154; 345/419
See application file for complete search history.

(56) References Cited

U.S. PATENT DOCUMENTS

| | | | | |
|---|---|---|---|---|
| 6,798,406 B1 * | 9/2004 | Jones | ................. | H04N 13/0011 345/419 |
| 6,798,441 B2 | 9/2004 | Hartman et al. | | |
| 8,314,832 B2 * | 11/2012 | Mann | ................... | G06F 3/011 348/51 |
| 2007/0285508 A1* | 12/2007 | Gere | ................. | A61B 1/00183 348/42 |
| 2008/0112616 A1* | 5/2008 | Koo | .................... | H04N 13/0022 382/171 |
| 2010/0302352 A1* | 12/2010 | Jacek | ................. | H04N 13/0497 348/56 |
| 2013/0010055 A1* | 1/2013 | Raju | .................... | H04N 19/597 348/42 |

FOREIGN PATENT DOCUMENTS

WO        2011141529 A1    11/2011

* cited by examiner

*Primary Examiner* — Creighton Smith
(74) *Attorney, Agent, or Firm* — Brake Hughes Bellermann LLP

(57) ABSTRACT

Systems and methods are disclosed for a holopresence conferencing system using off-the-shelf videoconferencing systems. The holopresence conferencing system uses one high-definition stereoscopic camera per remote participant and discards all but a center portion of the right image and a center portion of the left image generated by the camera. The system concatenates the center portion of the right and the left image into a composite image and transmits the composite image via an off-the-shelf videoconferencing system. At the viewing location, the composite image is divided in half, recovering the right center portion and the left center portion. The right center portion and left center portion may be placed on a background and stereoscopically projected in high-definition on a semi-circular life-size screen. Viewing participants may wear glasses that allow the viewer to see the remote participant in three-dimensions.

20 Claims, 6 Drawing Sheets

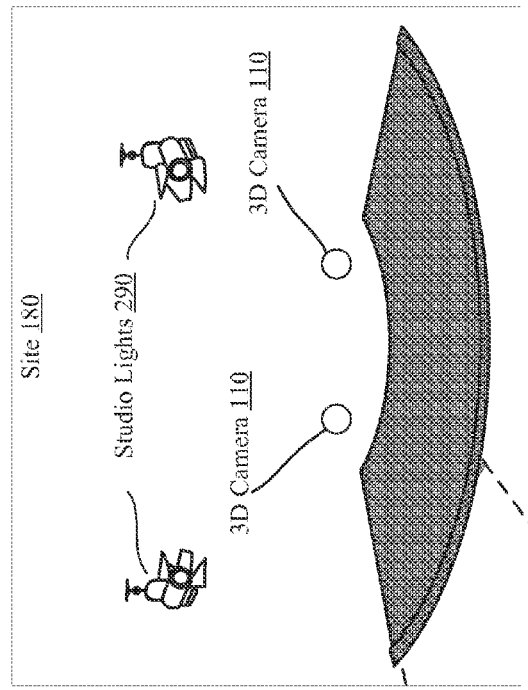
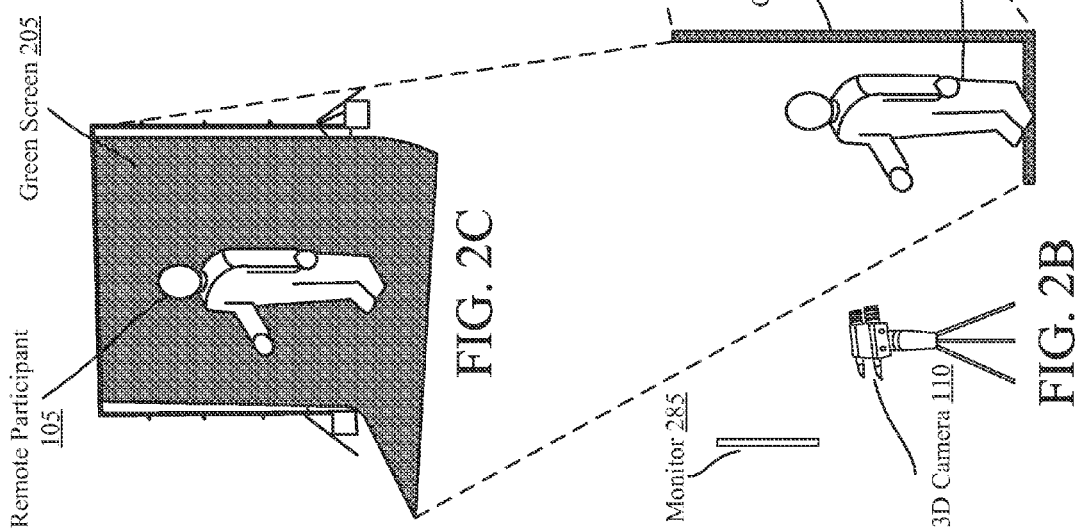

HOLOPRESENCE SYSTEM

BACKGROUND

Human communication includes visual cues in addition to verbal cues. Because of this, videoconferencing has emerged as a popular way for people in dispersed locations to conduct meetings. While videoconferencing offers the ability to see the participants at various locations, and to see a speaker or presentation, the conference can suffer from limited screen size. For instance, many conferencing systems show a current speaker in a larger area of the screen, relegating the other participants, including other presenters, to share a smaller portion of the screen. Thus, it is difficult to determine or pay attention to visual cues from anyone except the current speaker and switching between presenters can feel disjointed to the listening audience. Furthermore, many systems allow a presenter to share a presentation onscreen but this means the speaker is not onscreen, thus losing the visual cues of the speaker. When the speaker is onscreen with a presentation shown in the background, the presentation image is often poor.

SUMMARY

Implementations provide a holopresence conferencing system that enables one or multiple presenters to be projected in life-size, three-dimensional (3D), high definition (HD) quality using off-the-shelf videoconferencing systems and bandwidth. The system can provide an immersive environment, making those in the viewing room feel like they are in the same room as the presenters, even if the presenters are in locations separate from the viewers and each other. The system can also provide for simultaneous viewing of a presentation and a remote presenter, as if the presenter were in the same room. Thus, the audience feels as if the presenter is in the same room and can pick up on visual cues as well as easily follow the presentation.

The system may include a videoconferencing system and a high definition stereoscopic camera filming one remote participant against a green screen. The camera may include at least one processor and a memory storing instructions that, when executed by the at least one processor, causes the stereoscopic camera to crop a right portion and a left portion from a right image taken by the camera leaving a right center portion, crop a right portion and a left portion from a left image taken by the camera leaving a left center portion, concatenate the left center portion and the right center portion into a cropped composite image, and transmit the cropped composite image to the videoconferencing system. The videoconferencing system may transmit the cropped composite image to a viewing site that displays the image in life-size.

In another aspect, a method of conducting a video conference is provided that includes, at a remote participant site, capturing a right high-definition image and a left high-definition image of one remote participant, cropping a first portion of the right image from the right and a second portion of the right image from the left, leaving a right center portion, and cropping the first portion of the left image from the right and the second portion of the left image from the left, leaving a left center portion. The method also includes, at the remote participant site, concatenating the left center portion and the right center portion into a cropped composite image and transmitting the cropped composite image to a videoconferencing system at a viewing site. At the viewing site, the method includes receiving the cropped composite image, splitting the cropped composite image in half, recovering the left center portion and the right center portion, and stereoscopically projecting the left center portion and the right center portion in life-size.

In another aspect, a holopresence viewing site includes a life-size screen, a stereoscopic projection system, and a media engine with a holopresence video converter. The media engine with the holopresence video converter may be configured to receive a first image of a first remote participant from a first remote participant site, split the first image in half, generating a first right key image and a first left key image, receive a second image from a second remote participant site, and split the second image in half, generating a second right key image and a second left key image. The media engine may also be configured to place the first right key image and the first left key image at a first location on a background and place the second right key image and the second left key image at a second location on the background, wherein the stereoscopic projection system projects a three dimensional life-size image of the first participant at the first location on the background and a three dimensional life-size image of the second participant at the second location on the background.

In yet another aspect, a computer program product is provided, the computer program product being tangibly embodied on a computer-readable storage medium and comprising instructions that, when executed, are configured to cause a computer system to perform any of the methods or operations described herein.

Implementations provide one or more of the following benefits. For example, the viewing audience has the illusion that all other participants are with them in the same room because the other remote participants are displayed using an HD life-size stereoscopic projection in the same joint display. Thus, the audience experiences the conference in an immersive environment. Because the projected images are life-size HD quality, participants can see a very detailed image, making the immersive environment even more life-like and believable. Furthermore, the audience can pick up on visual communication cues not only from one presenter, but from any remote participant included in the display. Implementations eliminate the distinction between presenter locations as each presenter appears to be in the same local location, eliminating the switching of a background when one presenter picks up a conversation. Additionally, implementations use conventional hardware and bandwidth and, thus, can be implemented without expensive satellite links or highly specialized hardware. Additionally, implementations allow remote participants and audience members at viewing sites to jointly see and work on a computer screen, e.g., showing a document or presentation.

The details of one or more implementations are set forth in the accompanying drawings and the description below. Other features will be apparent from the description and drawings, and from the claims.

BRIEF DESCRIPTION OF THE DRAWINGS

FIGS. 2A-2C are illustrations of an example remote participant site for a holopresence conference, consistent with disclosed implementations.

DETAILED DESCRIPTION

Systems and methods consistent with disclosed implementations provide an immersive environment for conducting a video conference, so that the audience has the illusion that remote participants are in the room. The system and methods operate using standard video conferencing equipment and can combine multiple remote participants, whether in the same location or multiple different locations, into one high-definition, stereoscopic, life-size projection. All projected participants are projected onto a common background, so that the viewing audience cannot distinguish between the locations. In addition, presentation material can be added to the projection, allowing the viewing audience to see both the presenter and the presentation in life-size and high quality.

Figure 1:
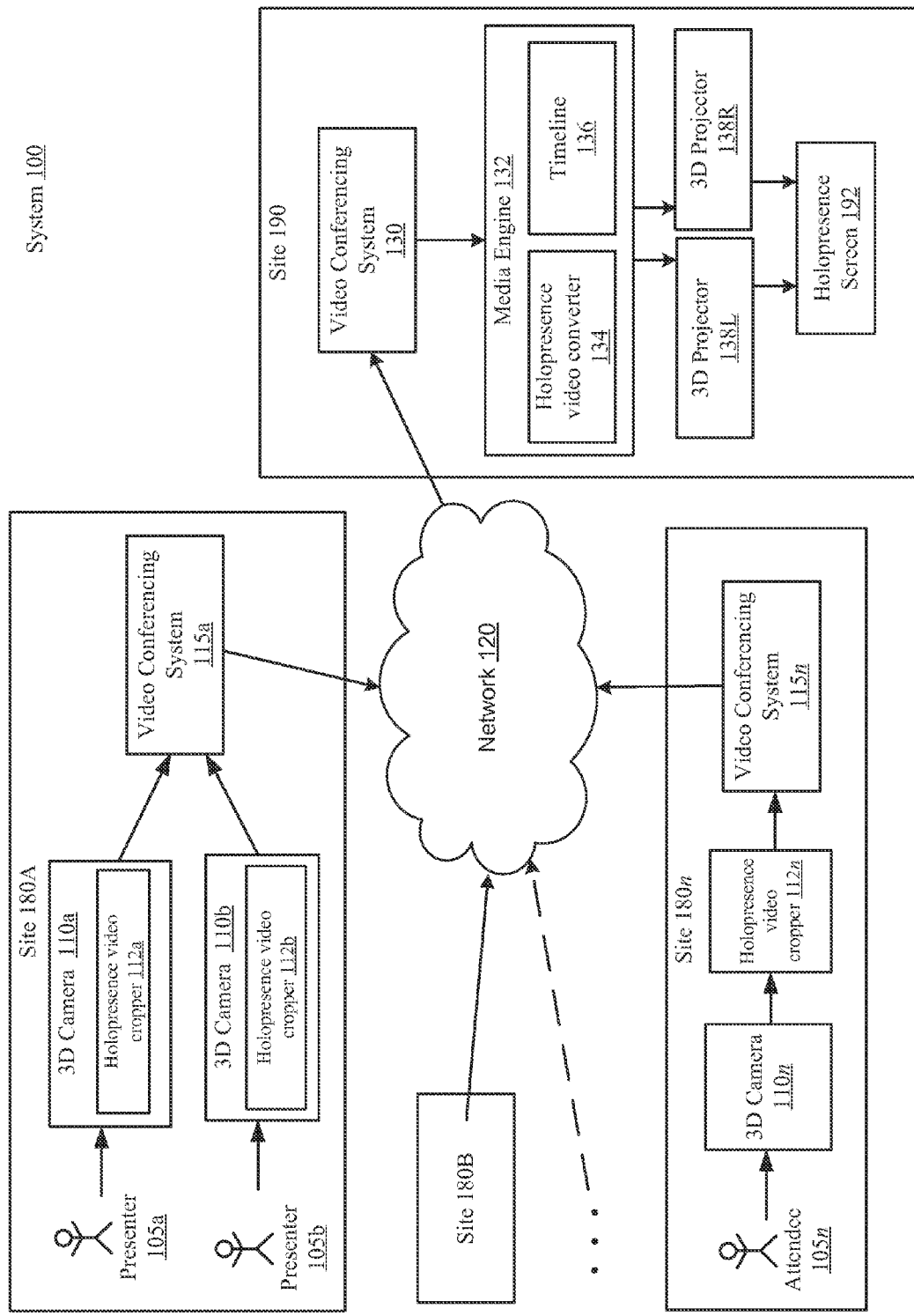
FIG. 1 is a block diagram of a system for conducting a holopresence conference.

FIG. 1 is a block diagram of a system 100 for conducting a holopresence conference. In the example of FIG. 1, there are multiple remote sites 180, illustrated as site 180A, 180B to 180*n*. The remote sites 180 may service one or more remote participants. A remote participant may be a presenter, as illustrated by presenter 105*a* and 105*b*, or may be an attendee, as illustrated by attendee 105*n*. Each remote site 180 may have one or more remote participants. For example, FIG. 1 illustrates two presenters at site 180A. Each remote participant has a corresponding stereoscopic camera 110. For example, presenter 105*a* has a corresponding stereoscopic camera 110*a* and presenter 105*b* has a corresponding stereoscopic camera 110*b*, even though the presenters are at the same remote site 180A. Having one camera 110 per remote participant enables the system 100 to generate and send a high-definition stereoscopic image using conventional bandwidth and equipment.

FIG. 2A illustrates a top view of an example remote site 180, according to an implementation. The remote site 180 may represent any of remote sites 180A to 180*n* of FIG. 1. In the example of FIG. 2A, the remote site 180 is hosting two remote participants. Each remote participant has a corresponding stereoscopic camera 110. FIGS. 2B and 2C illustrate an example camera arrangement for one of the remote participants at remote site 180. FIG. 2B illustrates a side view of the arrangement for the remote participant. As illustrated in FIG. 2B, the remote participant 105 is standing in front of a green screen 205. FIG. 2C is a front view of the remote participant 105 standing in front of the green screen 205. Although shown as standing, it is understood that the remote participant 105 may be seated. Of course, the seat or base may be covered in or formed using a material of the same color as the green screen 205. Green screens are common in videography and allow a producer or media engine to replace the green in the resulting image with another image or video to serve as the background. It is understood that the green screen 205 need not be green, but may be any monochromatic color. Thus, as used herein a green screen refers to any monochromatic background that can be replaced by another background in the media engine. It is also understood that the environment may have other green screen props. For example, a remote participant 105 may be seated behind a green screen desk or table. At the audience site 190, the green screen may be replaced with a background that includes a desk. Thus, remote participants 105 at different remote sites 180 may be projected at the audience site as sitting behind the same table or desk. Similarly, the remote participants 105 may be sitting on a green screen chair, table, or sofa and projected as sitting on a wall at the audience site.

The remote site 180 may include a monitor 285 for the remote participant 105. The monitor 285 may be used to display the audience at site 190 and any other remote participants at other remote sites 180 who are participating in the video conference, using a conventional video conference display. Thus, the remote participant 105 may not be in a holopresence environment, e.g., viewing the audience at the viewing site in life-size, high-definition, 3D projection. The monitor 285 may be visible to each remote participant at the site 180, or each remote participant may have their own monitor 285. In some implementations, the monitor 285 may also include a display from a computer screen, e.g., a document or presentation, that is also displayed at the viewing site 190 on a common background, as will be explained in more detail herein. The remote site 180 may also include studio lights 290 and other standard studio equipment (e.g., microphones, filters, etc.) to enhance the image projected by the camera 110. Studio lights 290 may be useful to properly light remote participants who are presenting.

As illustrated in FIG. 2A and FIG. 2B, each remote participant may have a corresponding camera 110. The camera may be on a tripod as illustrated in FIG. 2B, or suspended from the ceiling. In some implementations, the camera 110 may be configured to follow the remote participant 105, for example using tracking software or via a cameraman.

Returning to FIG. 1, each remote site 180 may also include a holopresence video cropper 112. The holopresence video cropper 112 may be included in the stereoscopic camera 110, as illustrated by camera 110*a* and holopresence video cropper 112*a*, or may be separate from the camera 110, as illustrated by holopresence video cropper 112*n*. In some implementations, the holopresence video cropper 112*n* may be a module included in a computing device, such as a tablet, laptop, desktop, server, etc., that connects the feed of camera 110*n* to the video conferencing system 115*n*. In some implementations the holopresence video cropper 112*n* may be a specialized device with its own processor and memory. Accordingly, it is understood that one or more of the stereoscopic cameras 110 and other computing devices may, in addition to the various components already described, include at least one processor and computer readable storage medium used to store instructions which, when executed by the at least one processor may cause the camera or other computing device to provide the features and functions described with regard to the holopresence video cropper 112. The computer readable storage medium may represent virtually any appropriate computer storage device, such as computer memory, that may be utilized to capture and edit images using the stereoscopic camera. The storage medium may also represent one or more mediums, and need not represent the same medium. For example, computer readable storage medium may represent RAM memory, cache memory, or disk storage.

The holopresence video cropper 112 may take in a right feed from the camera 110 and a left feed from the camera 110. Each feed may have a standard 16:9 aspect ratio or some other standard aspect ratio, such as 16:10 or an aspect ratio that supports 4K or 8K resolutions. Each image feed is also high-definition. High definition images are images with 1920× 1080 pixels or more (e.g., 4K or 8K pixels). The system uses high definition feeds because a good quality life-size projection requires a high-definition feed, as images with less pixels do not scale to life-size without pixilation, which results in a poor quality image. A life-size projection approximates the actual scale of the remote participant. Thus, life-size does not restrict projection to actual scale; rather life-size means the projected remote participant appears to be of conventional height for humans (e.g., four and a half feed to six and a half feet for adults.) Of course, high-definition feeds use more bandwidth, and a stereoscopic projection requires two such feeds, one for the right eye view and one for the left eye view. Furthermore, the right eye and left eye feeds must be synchronized. While conventional video conferencing equipment may handle two feeds, it does not provide synchronization, making a three-dimensional projection from un-synchronized feeds unworkable. In addition, some networks (e.g., the Internet or WANs) cannot handle the bandwidth requirements for two high definition feeds. While some systems attempted to solve these problems by squeezing the right and left images to fit into one 16:9 aspect ratio, this results in reduction of the horizontal resolution of the pictures by half. At the viewing site, the squeezed image may be stretched, but this results in pixel distortion because stretching results in rectangular rather than square pixels. A viewer may not notice the distortion caused by rectangular pixels on a small screen (e.g., a standard computer monitor), but when projected life-size the image quality is poor and does not result in a realistic picture.

To address this problem, the holopresence video cropper 112 crops the sides of the left and the right images obtained from the camera 110, leaving a center portion of the image. In some implementations, the holopresence video cropper 112 may crop one quarter from the left side and one quarter from the right side of the image. In some implementations, the holopresence video cropper 112 may crop more from a right side than from a left side, or vice-versa, with the total amount cropped being one half of the image. In other words, if the remote participant 105 moves to the left of center, the holopresence video cropper 112 may determine the participant has moved and may crop more from the right side than the left side. Put another way, the holopresence video cropper 112 may crop and discard half the image, where the discarded portions do not include the remote participant 105. It is understood that the amount cropped from the left side of the left image would be the same as the amount cropped from the left side of the right image. For example, if the original image has a 16:9 aspect ratio, the cropped image has an 8:9 aspect ratio, with the cropped image including the remote participant in or close to the center of the image.

Because each participant has a corresponding camera, the remote participant can be kept in the center of the image, and the system may dispose of the remainder of the image without losing or affecting the quality of the center portion that includes the remote participant. The holopresence video cropper 112 may combine the cropped left image and the cropped right image into a composite image. The composite image may have an aspect ratio that matches the aspect ration of the uncropped image. For example, if the left image and the right image each have a 16:9 aspect ratio, the composite image also has a 16:9 aspect ratio. Because the holopresence video cropper 112 disposes of half of the left image and half of the right image, both cropped images may now use the bandwidth of a single 16:9 image. In this manner, the holopresence video cropper 112 enables a high definition stereoscopic image to be transmitted in one standard feed without loss of pixel quality. This feed can be used as input to a conventional video conferencing system 115. e.g., a conferencing system using VC-1 codec. The VC-1 codec is a video codec specification standardized by the Society of Motion Picture and Television Engineers (SMPTE). Of course, the video conferencing system 115 may use a different standardized codec for higher resolution (e.g., 4K or 8K), with a camera 110 that records using the same codec. In some implementations, each camera 110 may have a corresponding video conferencing system 115. In some implementations, a remote site with two remote participants, such as site 180A, may use a conventional telepresence system in place of the video conferencing system 115a. The telepresence system can handle multiple simultaneous remote connections (e.g., a connection from camera 110a and a connection from camera 110b). Thus, it is understood that the video conferencing system 115 may include conventional telepresence systems.

Figure 3:
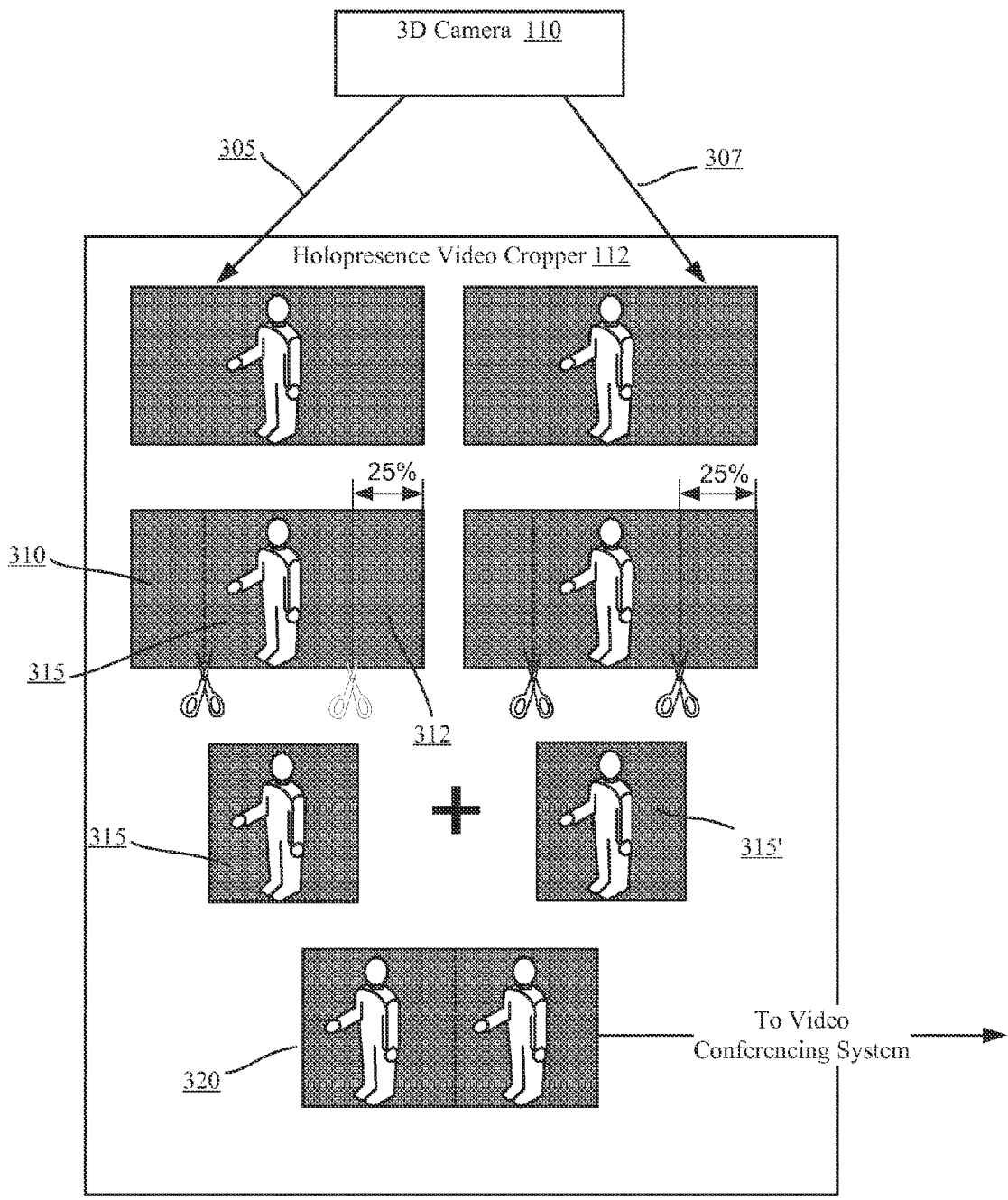
FIG. 3 is an example of video treatment in a holopresence video converter at a remote participant site, consistent with disclosed implementations.

FIG. 3 is an example of video treatment in a holopresence video converter at a remote participant site, consistent with disclosed implementations. As discussed above, the holopresence video cropper 112 may be included in camera 110 or may be included in a separate computing device. FIG. 3 illustrates image feeds 305 and 307 from the 3D camera 110. The holopresence video cropper 112 takes each feed and crops a right portion 310 and a left portion 312, leaving the remote participant in the center portion 315. The holopresence video cropper 112 discards the right portion 310 and left portion 312 and concatenates the two center portions 315 and 315' into one composite picture 320. The composite picture 320 is provided to the video conferencing system.

Returning to FIG. 1, the video conferencing system 115 may send the feed to a viewing site 190 via a network 120. The network 120 may be, for example, the Internet, or the network 120 can be a wired or wireless local area network (LAN), wide area network (WAN), etc., implemented using, for example, gateway devices, bridges, switches, and/or so forth. Network 120 may also represent a cellular communications network.

The viewing site 190 may include a conventional video conferencing system 130 that receives the transmitted signal from the various video conferencing systems 115. Thus, the video conferencing system 130 is compatible with the video conferencing systems 115 (e.g., using the same video codec). The video conferencing system 130 may provide the video feeds to a media engine 132. Media engines, also known as media servers, are commonly used in event shows and concerts to manage, manipulate, and coordinate multiple types of media. For example, the media engine 132 may be configured to receive the multiple video feeds, project the different feeds at different places on the holopresence screen 192, add a background to replace the green screen in the images, add a presentation, add sound, etc. On example of a media engine is WINGS AV Suite by AVStumpfl. Such media engines commonly use a timeline 136 to control which images appear where on the projection, where graphics are added, etc.

The media engine 132 may include a holopresence video converter 134. The holopresence video converter 134 takes the composite video feeds and splits the images that make up the feeds into two parts, the left part and the right part. These split images may then be inserted onto the timeline, for example placed at a specific location on the holopresence screen 192, combined with other split images from other remote sites 180, modified to have the green screen replaced with a background, etc. The timeline generates two video feeds, one for the left projector 138L and one for the right projector 138R, which project the feeds onto the holopresence screen 192.

Figure 4:
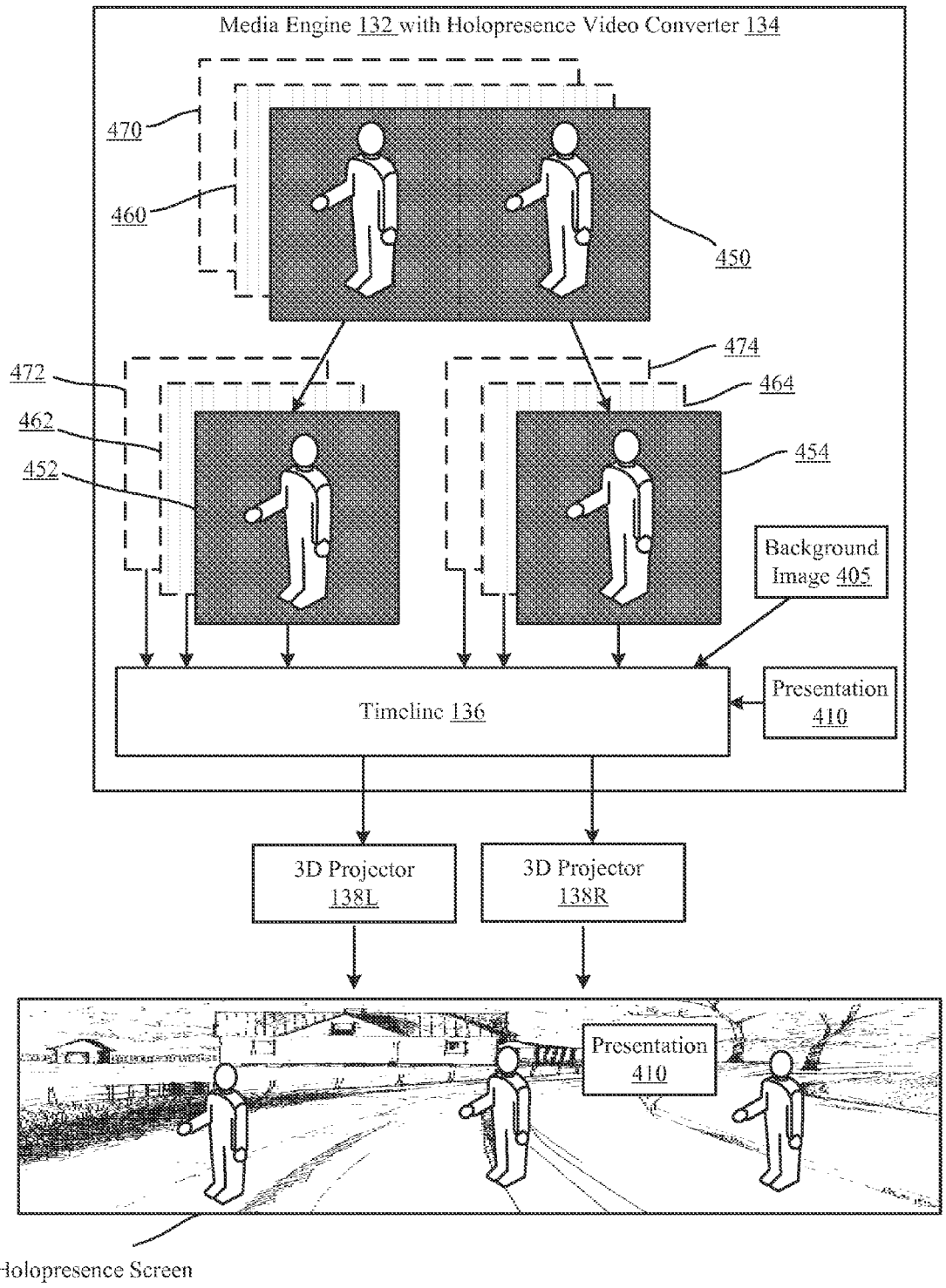
FIG. 4 is an example of video treatment in a holopresence video converter at a viewing site, consistent with disclosed implementations.

FIG. 4 is an example of video treatment in a holopresence video converter at a viewing site, consistent with disclosed implementations. FIG. 4 illustrates an example image 450 from a video feed from the receiving video conferencing system. The holopresence video converter 134 takes the image 450 and splits the image 450 into a left half 452 and a right half 454. The two halves are also referred to as key images and are provided to the timeline 136, which may combine them with a background 405, a presentation 410, and other key images 462, 464, 472, and 474 from other feeds (e.g., represented by images 460 and 470) for other remote participants. The media engine 132 may thus use the key images produce a left and right video stream provided to a left 138L and right 138R projector, respectively. The projectors 138L and 138R may project the image onto a holopresence screen 192.

Figure 5:
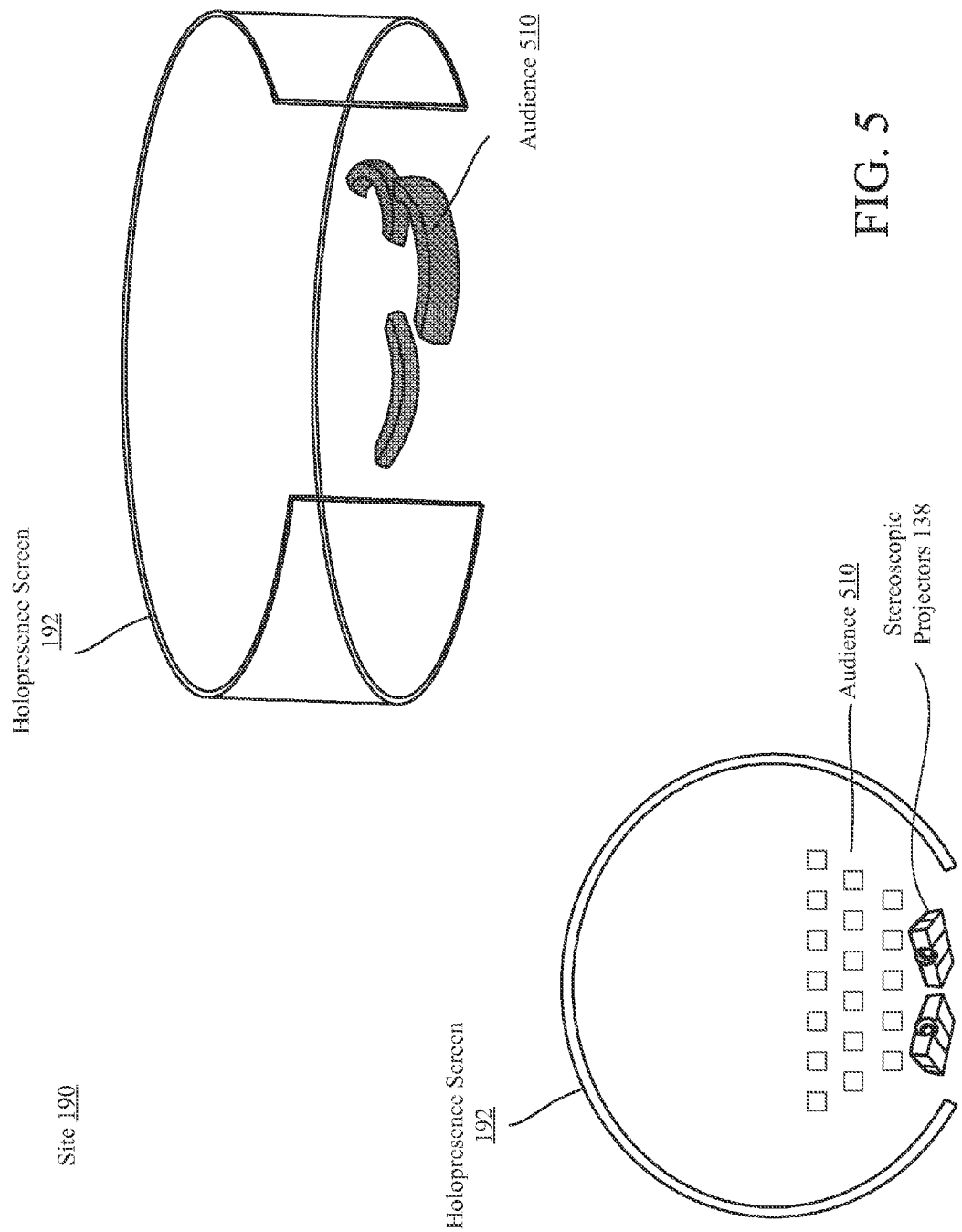
FIG. 5 is a top view and a perspective view of an example holopresence viewing site, consistent with disclosed implementations.

FIG. 5 illustrates a top view and a perspective view of example holopresence viewing sites, in accordance with disclosed implementations. The example viewing sites may be examples of site 190 of FIG. 1. The viewing site 190 includes a holopresence screen 192. The holopresence screen 192 is configured to provide the illusion to the audience 510 that the remote participants are present. The audience 510 may each be provided with stereoscopic glasses that are configured to work with the stereoscopic projection from the left projector 138L and right projector 138R. The audience 510 may be partially surrounded by a holopresence screen 192. The holopresence screen 192 is a circular life-size screen onto which the stereoscopic feed from the media engine 132 is projected. The arc of the holopresence screen 192 may range from 90 to 360 degrees and may be floor-to-ceiling to provide an immersive environment. The holopresence screen 192 of FIG. 5 has an arc of approximately 270 degrees, allowing for an opening through which the audience 510 may enter. In some implementations, the holopresence screen 192 may be 360 degrees, having a door through which the audience 510 may enter. In some implementations, the holopresence screen 192 may be life-size (e.g., at least five feet tall) but fail to extend floor-to-ceiling, may have an arc less than 90 degrees, or may be flat, although such implementations reduce the immersive effect, e.g. the illusion of the remote participants being in the same room. The audience 510 may be seated on conventional seating or may be free to wander about the interior of the viewing room, e.g., the space formed by the arc of the holopresence screen 192. In some implementations, the viewing site 190 is darkened for optimal projection.

In general, it may be appreciated that any single illustrated component in FIG. 1 may be implemented using two or more subcomponents to provide the same or similar functionality. Conversely, any two or more components illustrated in FIG. 1 may be combined to provide a single component which provides the same or similar functionality. In particular, as referenced above, the holopresence video cropper 112 may be incorporated into the stereoscopic camera 110, into the video conferencing system 115, or another computing device. Similarly, the media engine 132 may be incorporated into the projector 138L and 138R, or the media engine may be incorporated into the video conferencing system 130. In some implementations, the media engine 132 may be divided across two or more computing devices, each with their own processor and memory. Thus, FIG. 1 is illustrated and described with respect to example features and terminologies, which should be understood to be provided merely for the sake of example, and not as being at all limiting of various potential implementations of FIG. 1 which are not explicitly described herein.

Figure 6:
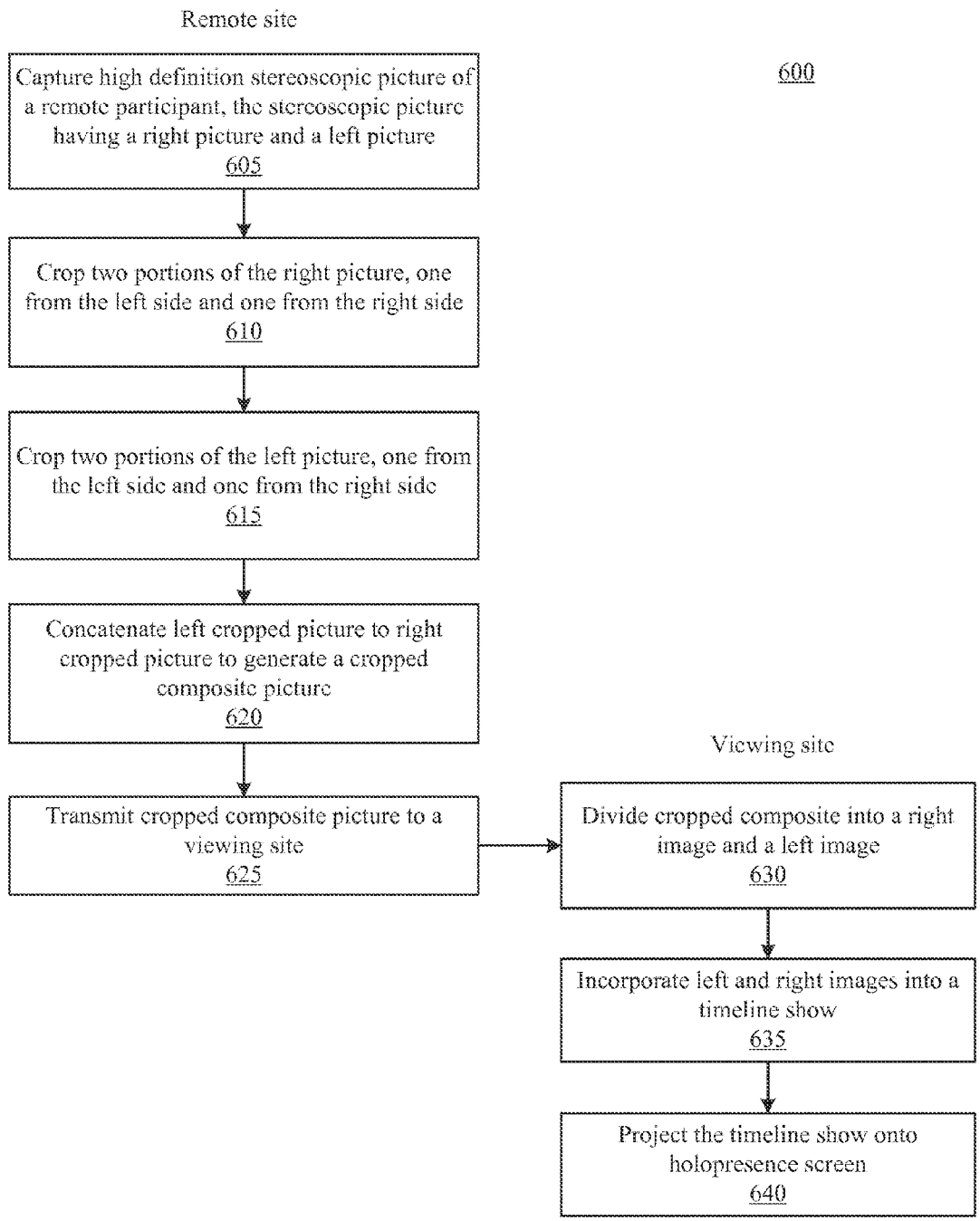
FIG. 6 is a flowchart illustrating an example process for conducting a holopresence conference using conventional video conferencing equipment, consistent with disclosed implementations.

FIG. 6 is a flowchart illustrating an example process 600 for conducting a holopresence conference using conventional video conferencing equipment, consistent with disclosed implementations. Process 600 may be performed in a holopresence conference system, such as system 100 of FIG. 1. In the example of FIG. 6, a stereoscopic video camera may take a high-definition picture of a remote participant (605). The remote participant may be a presenter, but may also be an attendee. The high-definition picture is understood to be a frame of a video feed. The stereoscopic video camera has a right lens and a left lens, each lens capturing a picture (e.g., via a video feed). Thus, the camera captures a left picture and a right picture. The holopresence system may crop two portions of the right picture, with one portion cropped from the right side and one portion cropped from the left side (610). The two portions may be equal portions. In some implementations, each of the two portions may represent one quarter of width of the right picture. In some implementations, the two portions equal half of the width of the right picture or, in other words, the system crops and discards half of the right picture. The system may also crop two portions from the left picture, one portion from the left side and one portion from the right side (615). The portion cropped from the left side of the left picture is the same size as the portion cropped from the left side of the right picture, so that the position of the remote participant in the picture remains the same in the left and right pictures after cropping.

The system may concatenate the left cropped picture to the right cropped picture, generating a composite cropped picture (620). The resulting composite cropped picture may have a common aspect ratio used in conventional video conferencing equipment, such as 16:9. The resulting composite cropped picture may also represent an undistorted high-definition picture of the remote participant. Undistorted means that the originally captured pixels have not changed, e.g., have not been squeezed or stretched. The common aspect ratio enables the system to transmit the composite picture via conventional video conferencing equipment, to a viewing site (625). It is understood that a video feed contains individual pictures that are replayed at a projector at a speed that appears to make the pictures move. Thus, it is understood that steps 605 to 625 are continuously repeated at the remote site to form a video feed as long as the video camera and the video conferencing system are turned on and functioning. Thus, the system creates a high-definition, undistorted, stereoscopic video feed that can be transmitted using conventional video equipment and bandwidth.

At the viewing site, the system receives the picture (e.g., as part of the video feed from a video conferencing system) and provides the input to a frame grabber of a media engine. The media engine includes a holopresence video converter that divides the received image in half, generating a right image and a left image (630). The left half and the right half are key images that are inserted into a timeline show (635). A timeline is a tool commonly provided in a media engine that enables combination of video feeds, sounds, still pictures, music, presentations, etc. into a show. The show may include projection on multiple screens and sound sent to multiple speakers, as well as light displays and other special effects. As part of generating the timeline show, the timeline tool may composite the key images with a background, e.g., replacing the green screen, and may also combine the key images with other key images from other remote participant sides (or from the same remote site but for a different remote participant) on the background. The timeline show may also control the sound from the video feed. For example, the viewing site may include several sets of speakers and the timeline tool may generate a show that causes sound from a first feed to be projected from speakers that are proximate to where the corresponding key images from the first feed are projected. The timeline show may be projected onto a holopresence screen (640). The holopresence screen may be a life-size or floor-to-ceiling screen or something in between and may partially surround the audience (e.g., having an arc of 90 to 360 degrees). In some implementations, the viewing audience at the viewing site may wear stereoscopic glasses to get the full 3D effect of the stereoscopic projected images. Because the quality of the original feed is retained, a viewer can stand close to the life-size projected image of a participant without seeing flaws (e.g., pixilation) in the projected image. This increases the illusion of the remote participant being at the viewing site.

Implementations of the various techniques described herein may be implemented in digital electronic circuitry, or in computer hardware, firmware, software, or in combinations of them. Implementations may be implemented as a computer program product, i.e., a computer program tangibly embodied a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors formed in a substrate executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices. e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback. e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a videoconferencing system; and
a high definition stereoscopic camera filming one remote participant against a green screen, the camera including:
at least one processor, and
a memory storing instructions that, when executed by the at least one processor, causes the stereoscopic camera to:
crop a right portion and a left portion from a right image taken by the camera leaving a right center portion,
crop a right portion and a left portion from a left image taken by the camera leaving a left center portion,
concatenate the left center portion and the right center portion into a cropped composite image, and
transmit the cropped composite image to the videoconferencing system,
wherein the videoconferencing system transmits the cropped composite image to a viewing site that displays the image in life-size.

2. The system of claim 1, wherein the videoconferencing system is an off-the-shelf video conferencing system.

3. The system of claim 2, wherein a resolution of the right image and of the left image is at least 1920×1080 pixels.

4. The system of claim 1, wherein the right portion and the left portion together are half of a width of the right image.

5. The system of claim 1, wherein pixels in the cropped composite image have a horizontal resolution equal to a horizontal resolution of pixels in the right image.

6. The system of claim 1, further comprising the viewing site, the viewing site including:
a life-size screen;
a stereoscopic projection system; and
a media engine with a holopresence video converter configured to: receive the cropped composite image,
split the cropped composite image in half, generating a right key image and a left key image, and
place the right key image and the left key image on a background, so the background replaces the green screen.

7. The system of claim 6, wherein the stereoscopic projection system projects the background in life-size on a semi-circular life-size screen.

8. The system of claim 7, wherein the semi-circular life-size screen has an arc of at least 90 degrees.

9. The system of claim 6, wherein the media engine with the holopresence video converter is further configured to:
place a presentation proximate the left key image and the right key image on the background.

10. A method of conducting a video conference comprising:
- at a remote participant site:
  - capturing a right high-definition image and a left high-definition image of one remote participant,
  - cropping a first portion of the right image from the right and a second portion of the right image from the left, leaving a right center portion,
  - cropping the first portion of the left image from the right and the second portion of the left image from the left, leaving a left center portion,
  - concatenating the left center portion and the right center portion into a cropped composite image, and
  - transmitting the cropped composite image to a videoconferencing system at a viewing site; and
- at the viewing site:
  - receiving the cropped composite image,
  - splitting the cropped composite image in half, recovering the left center portion and the right center portion, and
  - stereoscopically projecting the left center portion and the right center portion in life-size.

11. The method of claim 10, wherein transmitting the cropped composite image occurs via a conventional video conferencing system.

12. The method of claim 10, further comprising, at the viewing site:
- replacing green screen in the left image and the right image with a background.

13. The method of claim 10, wherein the remote participant is a first remote participant at the remote participant site and the method further comprises:
- at the remote participant site:
  - capturing a second right high-definition image and a second left high-definition image of one second remote participant,
  - cropping a third portion of the second right image from the right and a fourth portion of the second right image from the left, leaving a second right center portion,
  - cropping the third portion of the second left image from the right and the fourth portion of the second left image from the left, leaving a second left center portion,
  - concatenating the second left center portion and the second right center portion into a second cropped composite image, and
  - transmitting the second cropped composite image to the videoconferencing system at the viewing site; and
- at the viewing site:
  - receiving the second cropped composite image,
  - splitting the second cropped composite image in half, recovering the second left center portion and the second right center portion, and
  - stereoscopically projecting the second left center portion and the second right center portion in life-size.

14. The method of claim 13, wherein the second left center portion and the second right center portion are placed at a first location on a background and the left center portion and the right center portion are placed at a second location on the background, the background being stereoscopically projected in life-size.

15. The method of claim 10, wherein stereoscopically projecting includes projecting onto a semi-circular life-size screen.

16. The method of claim 15, wherein the screen has an arc of at least 90 degrees.

17. A holopresence viewing site comprising:
- a life-size screen;
- a stereoscopic projection system; and
- a media engine with a holopresence video converter configured to:
  - receive a first image of a first remote participant from a first remote participant site,
  - split the first image in half, generating a first right key image and a first left key image,
  - receive a second image from a second remote participant site,
  - split the second image in half, generating a second right key image and a second left key image,
  - place the first right key image and the first left key image at a first location on a background, and
  - place the second right key image and the second left key image at a second location on the background,
- wherein the stereoscopic projection system projects a three dimensional life-size image of the first participant at the first location on the background and a three dimensional life-size image of the second participant at the second location on the background.

18. The holopresence viewing site of claim 17, wherein pixels in the first right key image and the first left key image lack horizontal distortion.

19. The holopresence viewing site of claim 18, wherein the media engine with the holopresence video converter, when executed, are further configured to: place a presentation on the background at a third location.

20. The holopresence viewing site of claim 17, wherein the life-size screen has an arc of at least 90 degrees and has a floor-to-ceiling height.

* * * * *